US012196084B2

(12) United States Patent
Nair et al.

(10) Patent No.: US 12,196,084 B2
(45) Date of Patent: Jan. 14, 2025

(54) CARRIAGE ASSEMBLY

(71) Applicant: ZPE LTD, Bristol (GB)

(72) Inventors: Keith Nair, Bristol (GB); Daniel Spokes, Newent (GB)

(73) Assignee: ZPE LTD (GB)

( * ) Notice: Subject to any disclaimer, the term of this patent is extended or adjusted under 35 U.S.C. 154(b) by 0 days.

(21) Appl. No.: 18/681,714

(22) PCT Filed: Aug. 9, 2022

(86) PCT No.: PCT/EP2022/072360
§ 371 (c)(1),
(2) Date: Feb. 6, 2024

(87) PCT Pub. No.: WO2023/017041
PCT Pub. Date: Feb. 16, 2023

(65) Prior Publication Data

US 2024/0376823 A1 Nov. 14, 2024

(30) Foreign Application Priority Data

Aug. 13, 2021 (GB) ...................................... 2111668
Aug. 13, 2021 (GB) ...................................... 2111670

(51) Int. Cl.
*F01B 3/00* (2006.01)
*F01B 3/02* (2006.01)
(Continued)

(52) U.S. Cl.
CPC .............. *F01B 3/0026* (2013.01); *F01B 3/02* (2013.01); *F01M 2011/027* (2013.01); *F02B 75/26* (2013.01)

(58) Field of Classification Search
CPC ... F01B 3/02; F01B 3/0026; F01M 2011/027; F02B 75/26
See application file for complete search history.

(56) References Cited

U.S. PATENT DOCUMENTS 1,332,948 A 3/1920 Murphy
1,339,276 A 5/1920 Murphy
(Continued)

FOREIGN PATENT DOCUMENTS

DE 38 41 033 C1 4/1990
DE 297 11 460 U1 8/1997
(Continued)

OTHER PUBLICATIONS

PCT Written Opinion of the International Preliminary Examining Authority for International Application No. PCT/EP2022/072360 mailed Jun. 27, 2023.
(Continued)

*Primary Examiner* — Kevin A Lathers
(74) *Attorney, Agent, or Firm* — King & Partners, PLC

(57) ABSTRACT

Aspects of the present invention relate to a carriage assembly (3-n) for a swash plate engine (1) having a swash plate (7). The carriage assembly (3-n) has a carriage body (19) for reciprocating along a longitudinal axis (X-n). The carriage body (19) is configured to be connected to at least one piston (5-n). At least one bearing assembly (20-n) is disposed on the carriage body (19). The or each bearing assembly (20-n) includes a rolling bearing (21-n) configured to engage a rolling face of the swashplate (7); and a yoke (23-n) for supporting the rolling bearing (21-n). The yoke (23-n) is movable relative to the carriage body along the longitudinal axis. Aspects of the present invention also relate to a swash plate drive assembly (15); and a swash plate engine (1).

20 Claims, 7 Drawing Sheets

(51) Int. Cl.
*F01M 11/02* (2006.01)
*F02B 75/26* (2006.01)

(56) References Cited

U.S. PATENT DOCUMENTS

| | | | | |
|---|---|---|---|---|
| 1,352,985 | A | 9/1920 | Murphy | |
| 1,409,057 | A | 3/1922 | Michell | |
| 1,466,144 | A | 8/1923 | Murphy | |
| 3,151,527 | A | 10/1964 | Hamlin | |
| 3,939,809 | A | 2/1976 | Rohs | |
| 5,368,450 | A | 11/1994 | Fujii et al. | |
| 5,507,253 | A | 4/1996 | Lowi, Jr. | |
| 5,517,953 | A | 5/1996 | Wiesen | |
| 6,305,335 | B1 | 10/2001 | O'Toole | |
| 7,380,490 | B2 | 6/2008 | Kadlicko | |
| 2004/0118365 | A1* | 6/2004 | Brueckmueller | F02B 75/26 123/56.3 |
| 2009/0145377 | A1 | 6/2009 | Gaiser et al. | |
| 2010/0132354 | A1 | 6/2010 | Fanner et al. | |
| 2019/0112926 | A1 | 4/2019 | Hemink | |

FOREIGN PATENT DOCUMENTS

| | | | | |
|---|---|---|---|---|
| GB | 441249 | | 1/1936 | |
| GB | 976608 | | 12/1964 | |
| GB | 1572632 | | 7/1980 | |
| JP | 2004144075 | A * | 5/2004 | E02B 7/44 |
| WO | WO-0236949 | A1 * | 5/2002 | F01B 3/04 |
| WO | WO 2006/133452 | | 12/2006 | |
| WO | WO 2013/095112 | | 6/2013 | |
| WO | WO 2023/017037 | | 2/2023 | |

OTHER PUBLICATIONS

PCT Written Opinion of the International Searching Authority for International Application No. PCT/EP2022/072356.
International Application Status Report for International Application No. PCT/EP2022/072360.
International Application Status Report for International Application No. PCT/EP2022/072356.
PCT International Preliminary Report on Patentability for International Application No. PCT/EP2022/072360.
Combined Search and Examination Report for GB2318006.0 dated Dec. 11, 2023.
Combined Search and Examination Report for GB2111670.2 dated Jan. 18, 2022.
Search Report for GB2111668.6 dated Jan. 18, 2022.
Examination Report for GB2111668.6 dated May 5, 2022.

* cited by examiner

CARRIAGE ASSEMBLY

CROSS-REFERENCE TO RELATED APPLICATION(S)

This application is a 8371 national phase of International Application Number PCT/EP2022/072360, filed on Aug. 9, 2022, which claims the benefit of Great Britain Patent Application Number 2111668.6, filed on Aug. 13, 2021 and Great Britain Patent Application Number 2111670.2, filed on Aug. 13, 2021-all of which are hereby incorporated herein by reference in their entirety, including all references cited therein.

TECHNICAL FIELD

The present disclosure relates to a carriage assembly. The carriage assembly is suitable for a swash plate engine. More particularly, but not exclusively, the carriage assembly is configured to cooperate with a swash plate disposed in the swash plate engine. The swash plate engine may be an axial piston, swash plate engine. Aspects of the invention relate to a carriage assembly for a swash plate engine, a swash plate drive assembly and a swash plate engine.

BACKGROUND

Swash plate engines utilise an angled disc to convert the linear axial motion of pistons into rotary motion. The rotary motion may, for example, comprise rotating a drive shaft. If the load is transferred via a yoke style roller bearing, the rolling bearings may be subjected to high operating load that may exceed design capacity. This may cause high wear rates and may cause premature bearing failure. This is largely due to high peak loads at the end of stroke coupled with high rotation speeds of the rolling bearings.

It is an aim of the present invention to address one or more of the disadvantages associated with the prior art.

SUMMARY OF THE INVENTION

Aspects and embodiments of the invention provide a carriage assembly for a swash plate engine, a swash plate drive assembly and a swash plate engine as claimed in the appended claims.

According to an aspect of the present invention there is provided a carriage assembly for a swash plate engine having a swash plate, the carriage assembly comprising:

- a carriage body for reciprocating along a longitudinal axis, the carriage body being configured to be connected to at least one piston; and
- at least one bearing assembly disposed on the carriage body;
- wherein the or each bearing assembly comprises:
  - a rolling bearing configured to engage a rolling face of the swashplate; and
  - a yoke for supporting the rolling bearing, the yoke being movable relative to the carriage body along the longitudinal axis.

At least in certain embodiments, the carriage assembly may reduce peak loads applied to the rolling bearing. The carriage assembly may be configured to absorb forces applied to the rolling bearing assembly. This may reduce the peak loads applied to the rolling bearing. At least in certain embodiments, this may reduce wear of the rolling bearing.

The energy absorbed by the bearing assembly may be controllably discharged over a longer period of time than prior art arrangements.

In use, the carriage assembly may be connected to one or more piston. The carriage assembly may comprise one or more connecting rod for connecting the or each piston to the carriage body. A connecting rod may be provided to connect each piston to the carriage body. The one or more connecting rod may be fastened to the carriage body. A first connecting rod may be fastened to a first side of the carriage body to connect a first piston to the carriage body. A second connecting rod may be fastened to a second side of the carriage body to connect a second piston to the carriage body. The carriage body may be disposed between the first and second pistons.

The carriage assembly may comprise a hydraulic chamber. A hydraulic fluid may accumulate in the hydraulic chamber. The hydraulic fluid may comprise oil or another suitable liquid. The hydraulic fluid may be supplied from a high-pressure source. A pump may be provided for supplying the hydraulic fluid. Alternatively, the hydraulic fluid may comprise a lubricant, such as oil, pumped by the swash plate engine. The oil may be engine oil circulated by the swash plate engine.

In use, the operating loads applied to the rolling bearing may at least partially be absorbed into the hydraulic fluid disposed in a hydraulic chamber. The release of the hydraulic fluid from the hydraulic chamber may be controlled. For example, a flow restrictor or valve may be provided for controlling the release of the hydraulic fluid. The flow restrictor may be fixed or may be variable. In certain embodiments, the hydraulic chamber may be refilled on each stroke of the or each piston connected to the carriage assembly. The hydraulic chamber may be refilled during each operating cycle of the swash plate engine.

The rolling bearing may comprise a roller bearing (also known as a rolling-element bearing or a rolling bearing). The roller bearing may be arranged to engage the rolling face of the swash plate.

The carriage assembly may comprise a spring for biasing the yoke towards the swash plate. The spring may be configured to apply a spring force to the yoke. The spring may comprise at least one conical disc spring, for example one or more Belville washer. Alternatively, or in addition, the spring may comprise at least one wave spring. The spring may be configured operatively to engage a distal end of a connecting rod connected to the piston associated with the carriage assembly. In use, the spring may be disposed between the yoke and an associated connecting rod.

A damper may be provided for absorbing loads applied to the or each bearing assembly. The damper may comprise an oil damper, for example. One or more spring member may be provided for biasing the rolling bearing towards the swash plate. The damper may comprise one or more chamber for containing oil. A flow restrictor may be provided to control the discharge of oil from the one or more chamber. The flow restrictor may be fixed or may be variable. Alternatively, or in addition, a resiliently deformable member may be provided for absorbing loads applied to the rolling bearing.

The yoke may comprise a bearing carrier for carrying the at least one bearing. The bearing carrier may, for example, comprise one or more arm for supporting a spindle.

The yoke may comprise a plunger. The plunger may be formed integrally or as a separate component. The plunger may be configured moveably to mount the yoke. The plunger may locate in an aperture formed in the carriage body. The aperture may comprise a cylindrical aperture. The aperture may comprise a bore formed in the carriage body. The plunger may be moveable within the aperture to enable movement of the yoke relative to the carriage body. The aperture may be configured operatively to receive a distal end of an associated connecting rod. The aperture may comprise a through hole formed in the carriage body. The plunger portion of the yoke may locate in a first end of the aperture and the distal end of the connecting rod may locate in a second end of the aperture.

The relative position of the yoke may be controlled by a hydraulic fluid, such as oil. The carriage assembly may comprise a hydraulic chamber for receiving a hydraulic fluid to displace the plunger relative to the carriage body. The hydraulic fluid may, for example, comprise oil. The hydraulic chamber may be formed in the yoke, for example in the plunger. The hydraulic chamber may comprise a chamber formed in the plunger. The chamber may comprise or consist of a blind hole formed in the plunger. When the carriage assembly is connected to the piston, the connecting rod may form a portion of the hydraulic chamber. The connecting rod may, for example, close the hydraulic chamber.

The hydraulic chamber may comprise a hydraulic chamber inlet for introducing the hydraulic fluid into the hydraulic chamber. The hydraulic chamber inlet may comprise an inlet port. In use, the hydraulic fluid may be introduced into the hydraulic chamber through the inlet port. The hydraulic chamber inlet may be formed in the carriage body or in the plunger.

The hydraulic chamber may comprise a hydraulic chamber outlet for expelling the hydraulic fluid from the hydraulic chamber. The hydraulic chamber outlet may comprise an outlet port for expelling the hydraulic fluid. The hydraulic chamber outlet may be formed in a sidewall of the plunger, for example. The hydraulic chamber outlet may comprise an outlet conduit extending in a transverse direction. The hydraulic chamber outlet may comprise an outlet conduit extending in a radial direction.

The carriage assembly may comprise an inlet valve for controlling the supply of hydraulic fluid to the hydraulic chamber. The inlet valve may comprise a one-way valve or a non-return valve. The inlet valve may be in the form of a ball valve. The inlet valve may comprise a ball and a spring member. The spring member may be configured to bias the ball towards a seated position in which the inlet valve is closed.

The hydraulic chamber outlet may be selectively placed in fluid communication with a carriage gallery provided in the carriage body. The hydraulic chamber outlet may be placed in fluid communication with the carriage gallery when the yoke is in a predetermined axial position. The fluid communication between the hydraulic chamber outlet and the carriage gallery may be interrupted when the yoke is displaced from the predetermined axial position. The interaction between the yoke and the carriage body may function as an outlet valve for controlling the expulsion of the hydraulic fluid from the hydraulic chamber.

Alternatively, or in addition, the carriage assembly may comprise an outlet valve for controlling the expulsion of the hydraulic fluid from the hydraulic chamber.

The carriage gallery may be configured to supply a lubricant to the rolling bearing. The lubricant may be supplied to the carriage gallery from a dedicated lubricant supply. Alternatively, or in addition, the lubricant may comprise or consist of the hydraulic fluid used to control the relative position of the yoke. The hydraulic fluid may be expelled from the hydraulic chamber into the carriage gallery for delivery to the rolling bearing. A flow controller may be provided for controlling the flow of hydraulic fluid through the carriage gallery. The flow controller may comprise a flow restrictor. The flow controller may be fixed or may be adjustable. The flow controller may comprise a bleed screw, for example.

The rolling bearing may comprise a lubricant supply port for receiving lubricant from the carriage gallery. The lubricant supply port may be configured to expel the lubricant through an aperture disposed in an inner casing of the rolling bearing.

The carriage assembly may be configured to be connected to first and second pistons. The at least one bearing assembly may comprises first and second said bearing assemblies for engaging opposing rolling faces of the swash plate.

The carriage assembly may comprise at least one connector for connecting a piston to the carriage body. The at least one connector may comprise a first connector for connecting a first piston to the carriage body; and a second connector for connecting a second piston to the carriage body.

The yoke may comprise one or more guide. The one or more guide may maintain alignment of the yoke relative to the carriage body. The one or more linear guide may locate in an aperture, such as a channel, formed in the carriage body. The one or more guide may travel within the aperture as the yoke moves relative to the carriage body.

According to a further aspect of the present invention there is provided a swash plate drive assembly comprising a carriage assembly as described herein. The swash plate drive assembly may comprise at least one piston and at least one connecting rod.

A supply conduit may be provided for supplying hydraulic fluid to the hydraulic chamber. The supply conduit may extend in a longitudinal direction. The supply conduit may be configured to supply hydraulic fluid to the hydraulic chamber. A non-return valve may be provided for selectively closing the supply conduit.

The connecting rod may comprise a connecting rod supply conduit for supplying hydraulic fluid to the hydraulic chamber. The connecting rod supply conduit may extend in a longitudinal direction along the connecting rod. The connecting rod supply conduit may be placed in fluid communication with a high-pressure source of hydraulic fluid when the connecting rod is in a predetermined position. The predetermined axial position may comprise a top dead centre (TDC) position of the connecting rod. The connecting rod supply conduit may comprise an inlet formed in a sidewall of the connecting rod.

An inlet valve may be provided for controlling the supply of hydraulic fluid from the connecting rod supply conduit into the hydraulic chamber. The inlet valve may comprise a one-way valve or a non-return valve. The inlet valve may be configured selectively to close an outlet of the connecting rod supply conduit.

According to a further aspect of the present invention there is provided a carriage assembly for a swash plate engine having a swash plate, the carriage assembly comprising:

a carriage body for reciprocating along a longitudinal axis;

the carriage body having a first yoke for connecting to a first piston; and a second body portion having a second yoke for connecting to a second piston;

wherein the first and second body portions are moveable relative to each other along the longitudinal axis. The first and second yokes may be mounted to the first and second body portions in a fixed arrangement which inhibits or suppresses relative movement. In this arrangement, the relative movement of the first and second body portions may be controlled to reduce dynamic loading of the first and second bearings. A hydraulic chamber may be provided to control movement of the first and second body portions relative to each other. A damper or shock-absorber may be provided to damp movement of the first and second body portions relative to each other.

According to a further aspect of the present invention there is provided a swash plate engine comprising at least one carriage assembly as described herein. The swash plate engine may comprise a plurality of the carriage assemblies.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A swash plate engine 1 comprising a plurality of carriage assemblies 3-*n* in accordance with an embodiment of the present invention is described herein with reference to the accompanying Figures. The swash plate engine 1 in the present embodiment is an axial piston, swash plate engine. The swash plate engine 1 may be operable to drive an electric generator to generate electricity. Other applications are contemplated for the swash plate engine 1.

Figure 1:
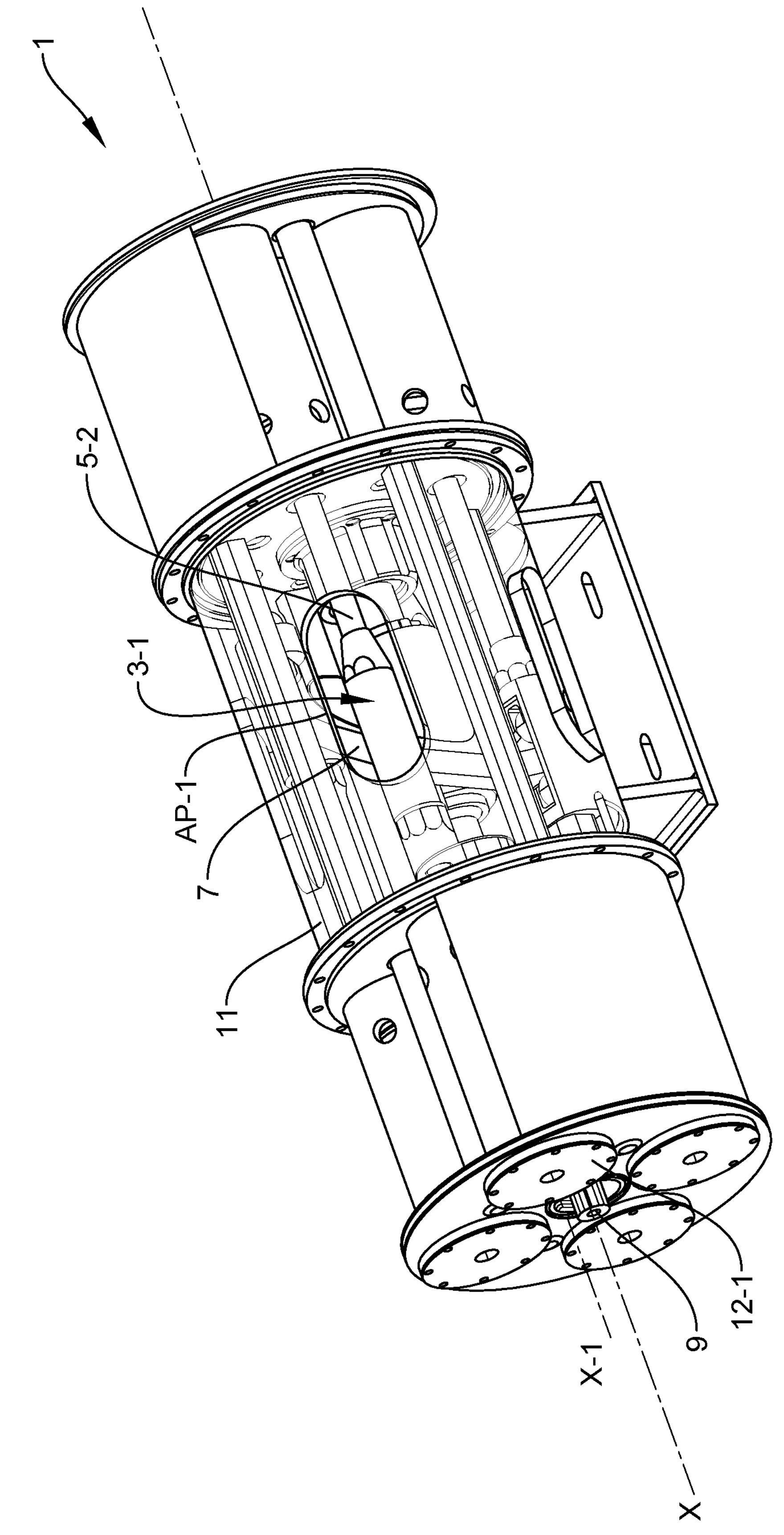
FIG. 1 shows a perspective view of a swash plate engine incorporating a plurality of carriage assemblies in accordance with an embodiment of the present invention.

The swash plate engine 1 comprises a plurality of pistons 5-*n*, a swash plate 7 (also known as a slant disk or an angled disk), a drive shaft 9 and a housing 11. A perspective view of the swash plate engine 1 is shown in FIG. 1 with sections of the housing 11 shown partially transparent to facilitate understanding. The housing 11 is generally cylindrical in shape and has a central longitudinal axis X. The housing 11 comprises a plurality of cylinder heads 12-*n* removably mounted to an end plate. Each cylinder head 12-*n* is associated with a respective one of the pistons 5-*n*. The drive shaft 9 is rotatable about the central longitudinal axis X. The swash plate 7 is disposed at an oblique angle to the central longitudinal axis X. The swash plate engine 1 in the present embodiment comprises eight (8) pistons 5-*n*. The pistons 5-*n* are axial pistons each connected to a connecting rod 13-*n* arranged to reciprocate along a longitudinal axis X-n extending at least substantially parallel to the central longitudinal axis X. Each piston 5-*n* is disposed in a cylinder configured to form a combustion chamber in which a fuel is combusted. The fuel may, for example, be gasoline or diesel. Other types of fuel are also contemplated.

Figure 2:
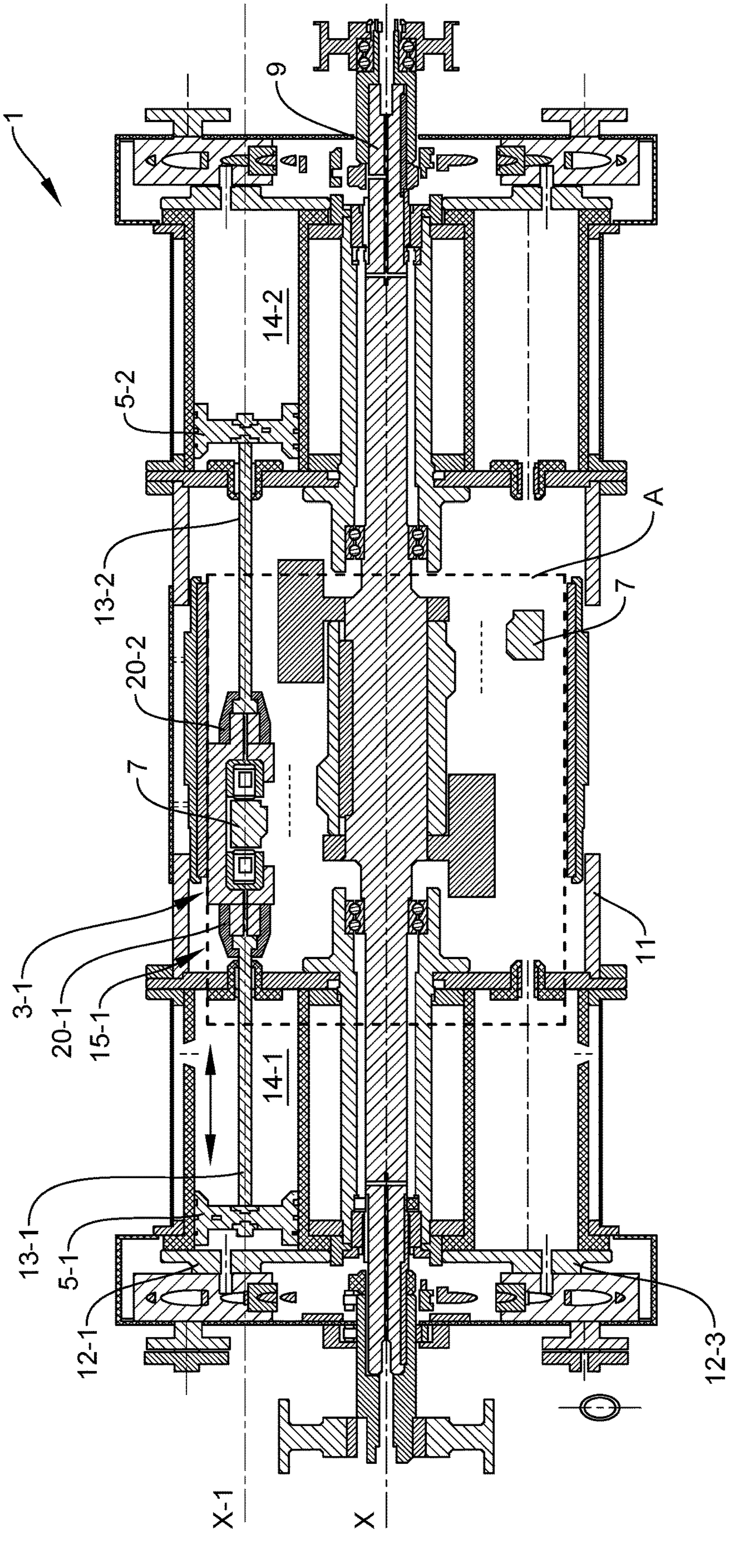
FIG. 2 shows a longitudinal sectional view of the swash plate engine shown in FIG. 1.
Figure 3:
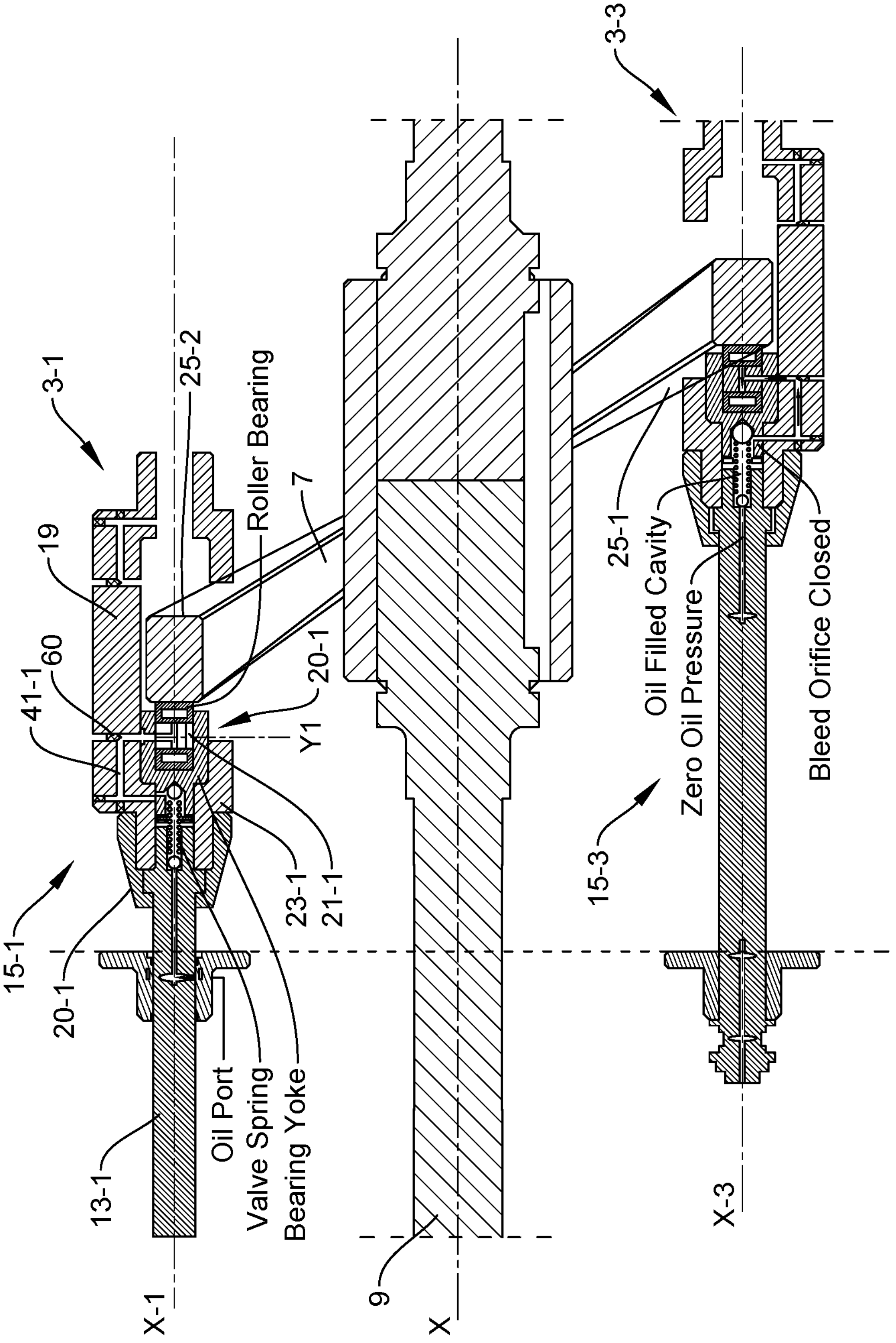
FIG. 3 shows an enlarged view of a portion of the longitudinal sectional view shown in FIG. 2.
Figure 4B:
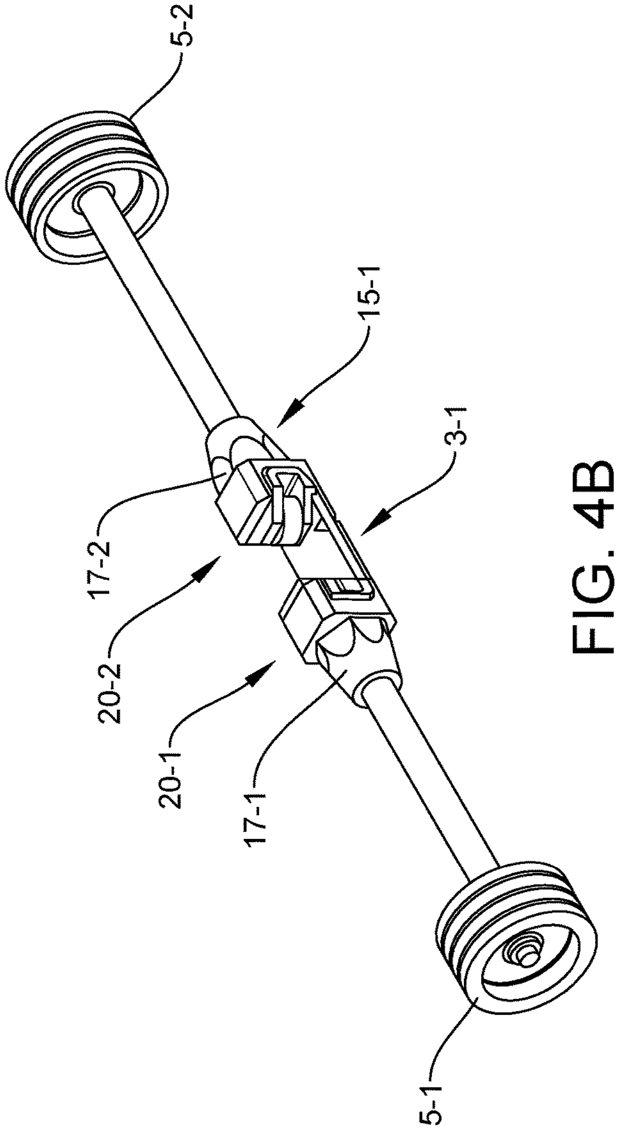
FIG. 4B shows a perspective view of the first swash plate drive assembly shown in FIG. 4A.
Figure 4A:
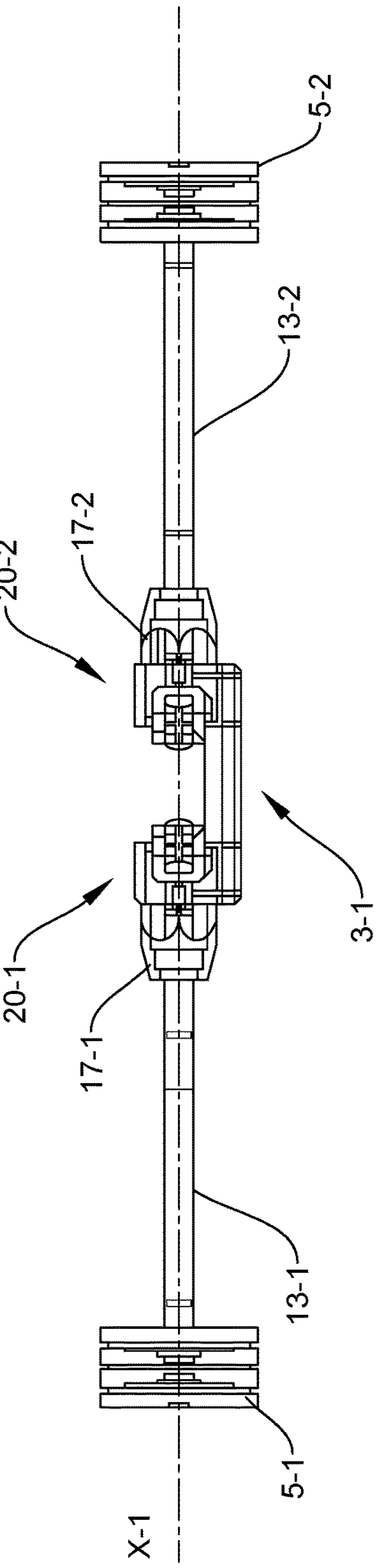
FIG. 4A shows a side view of a first swash plate drive assembly comprising a first carriage assembly and first and second axial pistons.

A longitudinal sectional view of the swash plate engine 1 is shown in FIG. 2. An enlarged view of the region labelled A in FIG. 2 is shown in FIG. 3. The carriage assemblies 3-*n* are configured to engage the swash plate 7. The carriage assemblies 3-*n* are configured to translate along the longitudinal axis X-n. The pistons 5-*n* are coupled to the carriage assemblies 3-*n* and, in use, drive the carriage assemblies 3-*n*. The pistons 5-*n* each reciprocate between a top dead centre (TDC) position and a bottom dead centre (BDC) position. The combination of each carriage assembly 3-*n* and one or more of the pistons 5-*n* forms a swash plate drive assembly 15-*n*. A first swash plate drive assembly 15-1 is shown in FIGS. 4A and 4B. In the present embodiment, the pistons 5-*n* are arranged in pairs comprising first and second pistons 5-1, 5-2 disposed on opposing first and second sides of the swash plate 7. Only the first and second pistons 5-1, 5-2 are shown in FIG. 2 for the sake of clarity. The first and second pistons 5-1, 5-2 are connected to opposite sides of the carriage assembly 3-*n*. The first and second connecting rods 13-1, 13-2 are connected to the first and second pistons 5-1, 5-2 respectively. The first and second connecting rods 13-1, 13-2 are fastened to the opposing sides of the carriage assembly 3-*n*. The first and second pistons 5-1, 5-2 are actuated to drive the carriage assembly 3-*n* along the longitudinal axis X-n in opposing first and second directions. The carriage assembly 3-*n* applies an axial force to the swash plate 7 which causes the drive shaft 9 to rotate. In use, the pistons 5-*n* are actuated sequentially to apply the axial force to the swash plate 7 to drivingly rotate the drive shaft 9.

In the present embodiment, the swash plate engine 1 comprises four (4) of the carriage assemblies 3-*n*. The carriage assemblies 3-*n* have a uniform angular separation (90° in the present embodiment) around the circumference of the swashplate 7. As outlined above, the carriage assemblies 3-*n* are each connected to opposing first and second pistons 5-*n*. The carriage assemblies 3-*n* are arranged to reciprocate along the longitudinal axis X-n in unison with the first and second pistons 5-*n*. The carriage assemblies 3-*n* each support at least one bearing assembly 20-*n*. The carriage assemblies 3-*n* each have like configurations. A first one of the carriage assemblies 3-1 will now be described with reference to FIGS. 2 to 5.

The first carriage assembly 3-1 comprises a first carriage body 19, a first bearing assembly 20-1 and a second bearing assembly 20-2. The second bearing assembly 20-2 is omitted from FIG. 2 for clarity. The first and second bearing assemblies 20-1, 20-2 have like configurations. The first bearing assembly 20-1 comprises a first bearing 21-1 and a first yoke 23-1. The first bearing 21-1 is supported in the first yoke 23-1. The second bearing assembly 20-2 comprises a second bearing 21-2 and a second yoke 23-2. The second bearing 21-2 is supported in the second yoke 23-2. The first and second bearings 21-1, 21-2 are configured to engage opposing first and second rolling faces **25-*n* of the swash plate 7. The first and second bearings 21-1, 21-2 are configured to contact the first and second rolling faces 25-*n* respectively of the swash plate 7. The first bearing 21-1 comprises a first roller bearing (also known as a rolling bearing or a rolling-element bearing) rotatable about a first bearing axis Y-1; and the second bearing 21-2 comprises a second roller bearing (also known as a rolling bearing or a rolling-element bearing) rotatable about a second bearing axis Y-2. The first and second bearings 21-1, 21-2 each comprise an inner race, an outer race and a plurality of rolling elements. In use, the outer races of the first and second bearings 21-1, 21-2 directly engage the first and second rolling faces 25-*n* respectively. The outer race of the first and second bearings 21-1, 21-2 may comprise an outer profile which is cylindrical, part-cylindrical, part-spherical or spherical. The first and second bearing axes Y-1, Y-2 extend substantially parallel to each other in a radial direction substantially perpendicular to the first longitudinal axis X-1. The first and second bearings 21-1, 21-2 are configured to engage the first and second rolling faces 25-1, 25-2 respectively of the swashplate 7**.

The first and second bearings 21-1, 21-2 are adapted to withstand the operating loads generated during operation of the swash plate engine 3. The first and second bearings 21-1, 21-2 in the present embodiment each comprise a yoke track roller. The outer race of each of the first and second bearings 21-1, 21-2 has an increased thickness (compared to a conventional bearing) to withstand higher operating loads, particularly loads applied in a radial direction. A plurality of needle rollers are disposed between the inner and outer races of the first and second bearings 21-1, 21-2. Other types of roller bearings may be employed. For example, the first and second roller bearings may comprise a cylindrical roller bearing, a spherical roller bearing or a needle roller bearing. A variant of the first and second bearings 21-1, 21-2 is described below with reference to FIGS. 6 and 7.

The first and second yokes 23-1, 23-2 are moveable relative to the first carriage body 19 along a longitudinal axis X-1. At least in certain embodiments, the movement of the first and second yokes 23-1, 23-2 relative to the first carriage body 19 may reduce the loading applied to the first and second bearings 21-1, 21-2. The configuration of the first yoke 23-1 will now be described with reference to FIGS. 3 and 4. It will be understood that the second yoke 23-2 has at least substantially the same configuration.

The first yoke 23-1 is moveable axially relative to the first carriage body 19 between a first position and a second position. The first position corresponds to a fully retracted position; and the second position corresponds to a fully advanced position. The first yoke 23-1 is in the fully retracted position when the first piston 5-1 is disposed in the top dead centre (TDC) position. The first yoke 23-1 is in the fully advanced position when the first piston 5-1 is disposed in the bottom dead centre (BDC) position. As shown in FIGS. 3 and 4, the first yoke 23-1 comprises a first bearing carrier 27-1 and a first plunger 29-1. The first bearing carrier 27-1 comprises first and second arms 30A, 30B in a Y-shaped configuration. The first bearing 21-1 is supported between the first and second arms 30A, 30B. In particular, the first and second arms 30A, 30B support a first bearing spindle 31-1 which defines the first bearing axis Y-1. The first bearing spindle 31-1 is hollow and comprises one or more bearing lubrication channel 33-1 operative to supply a lubricant to the first bearing 21-1. The bearing lubrication channel 33-1 comprises a first lubricant supply port 35-1 for receiving lubricant; and one or more first bearing outlet port 37-1. The or each first bearing outlet port 37-1 may comprise an aperture formed in the inner race of the first bearing 21-1 to facilitate lubrication of the rolling elements. As described herein, the first lubricant supply port 35-1 is in communication with a first gallery 41-1 formed in the carriage body 19. The first plunger 29-1 has a circular cross-section and is configured to enable axial movement of the first yoke 23-1 relative to the first carriage body 19. The first plunger 29-1 locates in a first aperture 43-1 formed in the first carriage body 19. The first aperture 43-1 is in the form of a bore extending in a longitudinal direction through the first carriage body 19. The first aperture 43-1 has a central axis which is coincident with the central longitudinal axis X-1 of the first connecting rod 13-1. The first plunger 29-1 is moveable axially along the central longitudinal axis X-1, thereby enabling the first yoke 23-1 to move relative to the first carriage body 19. A seal is formed between the sidewall of the first plunger 29-1 and the first aperture 43-1. One or more seal may optionally be provided on the first plunger 29-1, for example in the form of a piston ring. An annular yoke biasing spring 47 is provided to apply a spring force to bias the first yoke 23-1 towards the advanced position. As described herein, the annular yoke biasing spring 47 is disposed between the first yoke 23-1 and the first connecting rod 13-1. The annular yoke biasing spring 47 in the present embodiment comprises one or more conical washer, such as one or more Belville washer. In a variant, the yoke biasing spring 47 comprises a wave spring or a resiliently deformable member.

Figure 5:
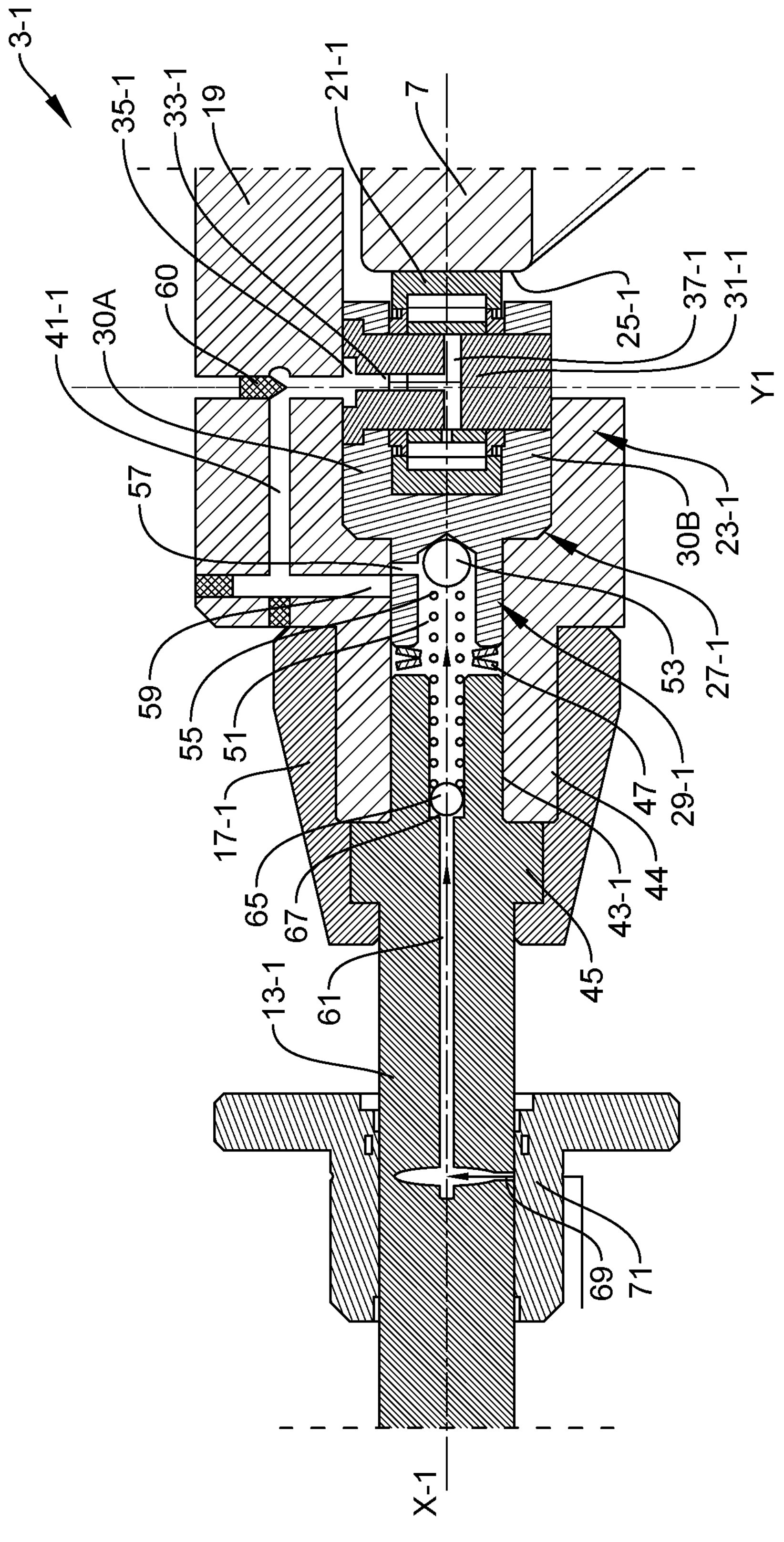
FIG. 5 shows a longitudinal sectional of a first one of the carriage assemblies in a first position relative to the carriage body.

The first carriage assembly 3-1 is configured to reciprocate along the first longitudinal axis X-1 in unison with the first and second pistons 5-1, 5-2. In the present embodiment, the first carriage body 19 is fastened to the first and second pistons 5-1, 5-2 by first and second mechanical fasteners 17-1, 17-2. The mechanical fasteners 17-1, 17-2 in the present embodiment each comprise a rotary fastener. In particular, the mechanical fasteners 17-1, 17-2 each comprise a mounting nut having an internal thread for cooperating with an external thread provided on the first carriage body 19. The mounting arrangement of the first and second connecting rods 13-1, 13-2 is substantially the same and will now be described with reference to the first piston 5-1. A distal end of the first connecting rod 13-1 is located in the first aperture 43-1 formed in the first carriage body 19. The first carriage body 19 comprises an annular portion 44 having an external thread for receiving the mechanical fastener 17-1. As shown in FIG. 5, the first connecting rod 13-1 comprises a locating member 45 for fixing the axial position of the first connecting rod 13-1 relative to the first carriage body 19. The locating member 45 is configured to abut an end wall of the annular portion 44 of the first carriage body 19. The locating member 45 in the present embodiment is in the form of a collar 45 configured to abut an end wall of the annular portion 44. A gasket (not shown) may optionally be provided between the collar 45 and the first carriage body 19 to form a seal. The mechanical fastener 17-1 engages the collar 45 to fasten the first connecting rod 13-1 to the first carriage body 19. The mechanical fastener 17-1 is configured to cooperate with a tool, such as a wrench, to apply torque to fasten or unfasten the mechanical fastener 17-1. The mechanical fastener 17-1 comprises at least one pair of opposing faces arranged parallel to each other. The mechanical fastener 17-1 in the present embodiment has a hexagonal profile (in transverse section) comprising three of the pairs of opposing faces. A wrench or similar tool may engage the mechanical fastener 17-1 to apply a torque.

The first and second mechanical fasteners 17-*n* can be removed to enable removal of the first carriage assembly 3-1, for example to perform maintenance or servicing. One or more aperture AP-n is provided in the housing 11 to provide access to the carriage assemblies 3-*n*. In the present embodiment, one of the apertures AP-n is associated with each carriage assembly 3-*n*. A removable closure panel closure panel (not shown) is mounted to the housing 11 to close the aperture AP-n. As described herein, the closure panel can be removed for maintenance or servicing of the carriage assembly 3-*n* through the aperture AP-n. The aperture AP-n is sized to enable removal of the carriage assembly 3-*n* through the aperture AP-n when the closure panel is removed.

The position of the first yoke 23-1 relative to the first carriage body 19-1 is controlled by the supply of a hydraulic fluid through the first connecting rod 13-1. The hydraulic fluid may, for example, comprise an oil. In the present embodiment, the hydraulic fluid controls the position of the first yoke 23-1 relative to the carriage body 19 and is also supplied to the first bearing 21-1 (via the first carriage body 26-1) to provide lubrication. The first plunger 29-1 comprises a first chamber 51 which forms a portion of a hydraulic chamber for receiving the hydraulic fluid. The first chamber 51 comprises a blind hole formed along the central longitudinal axis X-1. A locating member 53, such as a ball, is provided in the first chamber 51 for locating a valve spring 55. An outlet port 57 is formed in the first yoke 17-1 for selectively discharging hydraulic fluid from the first chamber 51 into the first gallery 41-1 formed in the first carriage body 19. The outlet port 57 comprises a radial aperture in fluid communication with the first chamber 51. The first gallery 41-1 comprises a gallery inlet 59 which aligns with the outlet port 57 when the first yoke 23-1 is in a predetermined position relative to the first carriage body 19. In the present embodiment, the outlet port 57 is configured to align with the carriage gallery inlet 59 when the first yoke 23-1 is in the retracted position relative to the carriage body 19, as shown in FIG. 5. The outlet port 57 is not aligned with the carriage gallery inlet 59 when the first yoke 23-1 is advanced from the retracted position. For example, the outlet port 57 is not aligned with the carriage gallery inlet 59 when the first yoke 23-1 is in the fully advanced position, as shown in FIG. 3. The carriage gallery inlet 59 is thereby closed and the supply of hydraulic fluid to the first gallery 41-1 is inhibited. A flow control device 60 is provided to control the supply of the hydraulic fluid from the first gallery 41-1 to the first bearing 21-1. In the present embodiment, the flow control device 60 comprises a bleed screw.

The first connecting rod 13-1 comprises a supply conduit 61 for supplying the hydraulic fluid to the first chamber 51. A non-return valve 63 prevents the return of hydraulic fluid through the supply conduit 61. The non-return valve 63 in the present embodiment is a ball valve comprising a ball 65 and a valve seat 67. Other types of valve, such as a poppet valve, could be used in the non-return valve 63. The valve spring 55 biases the ball 65 towards the valve seat 67 to close the supply conduit 61. The supply conduit 61 comprises an inlet aperture 69 which is selectively placed in communication with an engine supply port 71 connected to a high-pressure oil supply, such as an engine oil gallery. The inlet aperture 69 of the supply conduit 61 is placed in fluid communication with the engine supply port 71 when the first connecting rod 13-1 is in a predetermined position(s). In the present embodiment, the inlet aperture 69 is placed in fluid communication with the high-pressure oil supply when the first piston 5-1 or is disposed at the top dead centre (TDC) position.

The operation of the carriage assemblies 3-*n* are at least substantially the same as each other, albeit out of phase with each other. The operation of the first carriage assembly 3-1 during normal operation of the swash plate engine 1 will now be described with reference to FIGS. 2, 3 and 4.

The carriage assembly 3-*n* is shown with the first piston 5-1 in a fully retracted position in FIGS. 2, 3 and 5 corresponding to the top dead centre (TDC) position. In this configuration, the inlet aperture 69 is open to the engine supply port 71 and hydraulic fluid is introduced at high pressure into the supply conduit 61 formed in the first connecting rod 13-1. The hydraulic fluid is supplied at sufficient pressure to overcome the valve seat pressure applied by the valve spring 55, thereby unseating the ball 65 and opening the non-return valve 63. The hydraulic fluid is supplied via the engine supply port 71 to the first chamber 51 formed in the first yoke 23-1. The hydraulic fluid displaces the first yoke 23-1 to the fully advanced position relative to the carriage body 19. The outlet port 57 is out of alignment with the carriage gallery inlet 59 in this configuration such that the outlet from the first chamber 51 is closed, as shown in FIG. 3. The hydraulic fluid is introduced into the first chamber 51. The first plunger 29-1 is advanced, thereby displacing the first yoke 23-1 forwards relative to the first carriage body 19. The hydraulic fluid displaces the first yoke 23-1 to the fully advanced position relative to the carriage body 19. The first bearing 21-1 is displaced towards the first rolling face 25-1 of the swash plate 7.

When the first connecting rod 13-1 is advanced form the TDC position, the inlet aperture 69 is moved out of alignment with the engine supply port 71. The supply of hydraulic fluid to the supply conduit 61 is stopped. The valve spring 55 biases the ball 65 towards the valve seat 67 and closes the non-return valve 63. The outlet port 57 is not aligned with the carriage gallery inlet 59 and the first chamber 51 is at least substantially sealed. The hydraulic fluid within the first chamber 51 is held at pressure by the non-return valve 63. The first yoke 23-1 is hydraulically held in position (relative to the carriage body 19) by the pressure of the hydraulic fluid in the first chamber 51.

Figure 6:
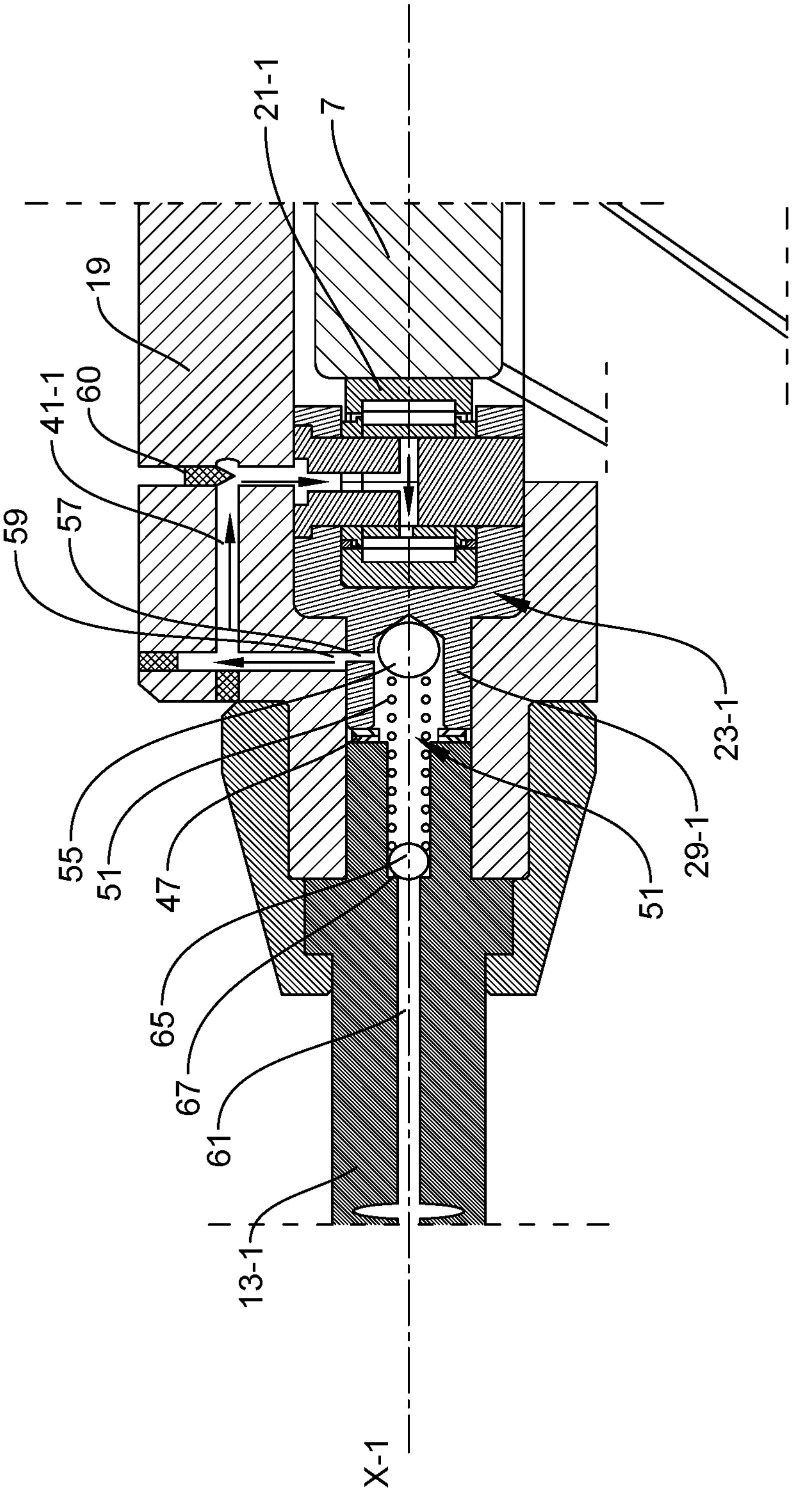
FIG. 6 shows a longitudinal sectional of the first one of the carriage assemblies in a second position relative to the carriage body.

As the first connecting rod 13-1 reaches the end of its stroke (corresponding to a bottom dead centre (BDC) position), the change in momentum of the first connecting rod 13-1 sets up a deceleration force on the first yoke 23-1. As shown in FIG. 6, the first yoke 23-1 is displaced relative to the first carriage body 19 under load and the change in the volume of the first chamber 51 forces the hydraulic fluid through the outlet port 57 into the first gallery 41-1 formed in the first carriage body 19. The hydraulic fluid is pumped through the first gallery 41-1 and into the first bearing 21-1. The hydraulic fluid is used to lubricate the first bearing 21-1. The rate that the hydraulic fluid is bled from the cavity determines the deceleration force acting on the first yoke 21-1. The bleed valve 60 can be adjusted to control the deceleration force acting on the first yoke 21-1. The yoke biasing spring 47 is compressed under the load in the last section of the travel of the first yoke 23-1.

At least in certain embodiments, the release of the hydraulic fluid from the first chamber 51 is effective in delaying the instantaneous change of momentum. This may decrease loading on the first yoke 23-1, for example to reduce the peak load applied to the first bearing 21-1. Furthermore, any gap between the first bearing 21-1 and the swash plate 7 can be maintained to a very small value. This may reduce manufacturing tolerances for components in the first carriage assembly 3-1, such as the first carriage body 19. By dynamically adjusting the axial position of the first yoke 23-1, the first carriage assembly 3-1 may allow for wear of the first bearing 21-1 and/or the first rolling face 25-1 of the swash plate 7.

The swash plate engine 1 according to the present embodiment may require servicing or maintenance. For example, a piston ring on one of the pistons 5-*n* may need to be replaced. Advantageously, the swash plate engine 1 can be serviced without requiring a complete disassembly of the housing 11. The closure panel(s) mounted on the housing 11 is removed to open one or more of the apertures AP-n. The aperture AP-n provides the operator with access to an associated one of the carriage assemblies 3-*n*. The mechanical fasteners 17-1, 17-2 fastening the first and second pistons 5-1, 5-2 to the carriage body 19 may be released. The cylinder heads 12-*n* may be removed from the housing 11. After releasing the connecting rods 13-1, 13-2 from the carriage body 19, the first and second pistons 5-1, 5-2 may be removed through the opposing ends of the swash plate engine 3. Thus, servicing or maintenance of the pistons 5-*n* and the carriage assemblies 3-*n* may be performed with the body 11 in place. The assembly of the swash plate engine 3 can be performed by performing the same operations in the reverse order.

It will be understood that the second, third and fourth carriage assemblies 3-2, 3-3, 3-4 undergo at least substantially the same operating cycle. The operation of the pistons 13-*n* is controlled to maintain operation of the swash plate engine 3 in known manner.

The first and second bearings 21-1, 21-2 in the above embodiment each comprise a yoke track roller. An alternative bearing arrangement for the first and second bearings 21-1, 21-2 will now be described with reference to FIGS. 6 and 7. The bearing arrangement will be described with reference to the first bearing 21-1, but it will be understood that the second bearing 21-2 has at least substantially the same configuration. The first bearing 21-1 is mounted in a modified version of the first yoke 23-1 and the changes in the configuration of the yoke 23-1 will also be described. It will be understood that the first bearing 21-1 and/or the first yoke 23-1 may be used in the carriage assembly 3-*n* described in the above embodiment of the present invention. Like reference numerals are used for like components.

Figure 7:
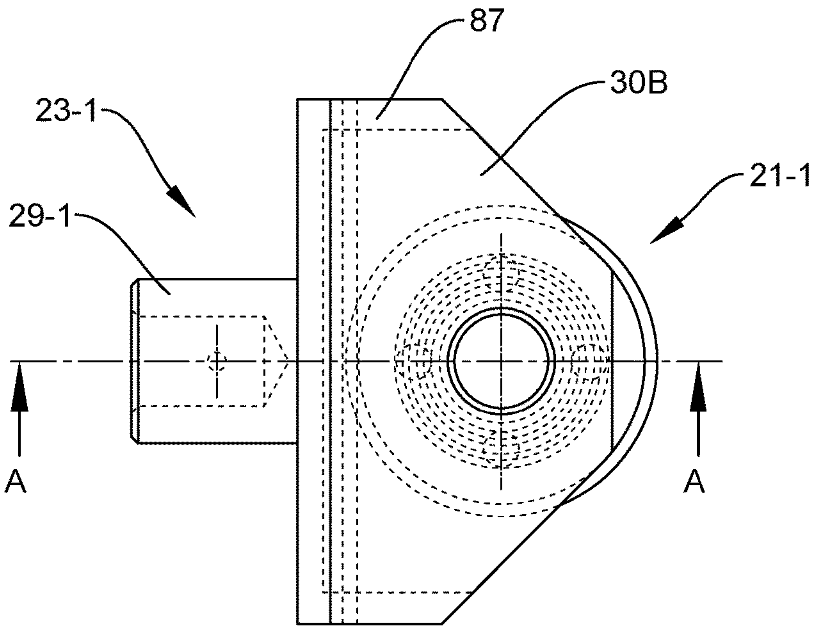
FIG. 7 shows a plan view of a variant of the yoke and bearing assembly used in the carriage assembly.
Figure 8:
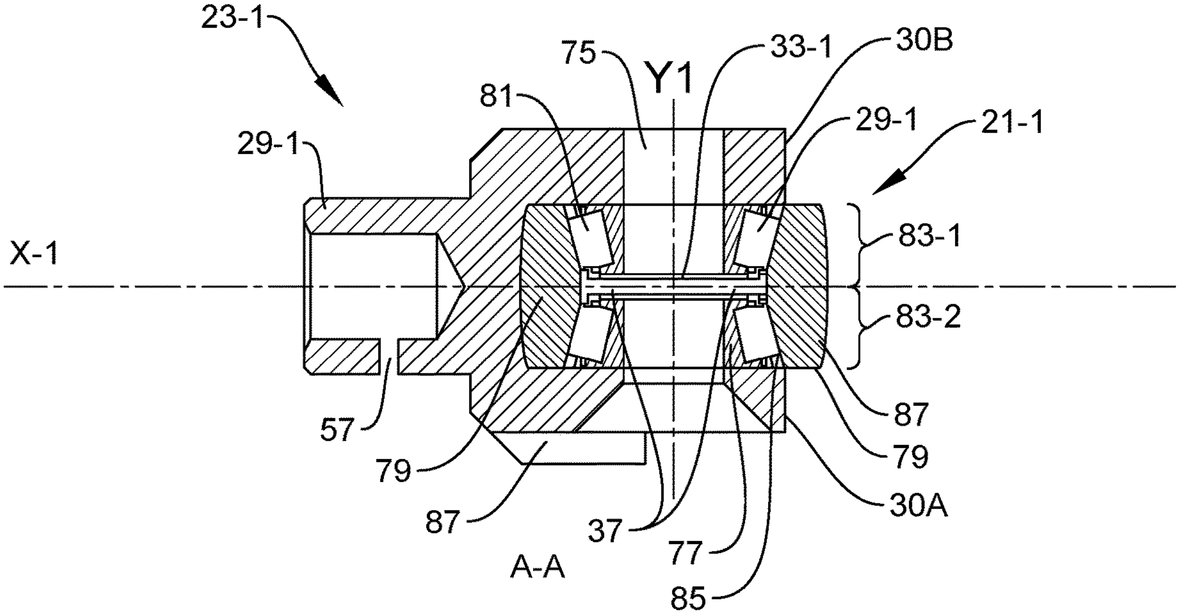
FIG. 8 shows a sectional view along the section line A-A of FIG. 7.

A plan view of the first yoke 23-1 and the first bearing 21-1 is shown in FIG. 7. A longitudinal sectional view along the section line A-A of FIG. 7 is shown in FIG. 8. The first bearing 21-1 comprises a spindle 75, an inner race 77, an outer race 79 and rolling elements 81. The spindle 75 is hollow and comprises one or more bearing lubrication channel 33-1 operative to supply a lubricant to the rolling elements 81. As described herein, the bearing lubrication channel 33-1 is configured to receive lubricant from the first carriage 41-1 (not shown in FIG. 7). The bearing lubrication channel 33-1 comprises a lubricant supply port 35-1 for receiving lubricant; and two first bearing outlet ports 37 for delivering the lubricant to the rolling elements 81. The bearing outlet ports 37 are diametrically opposed from each other in the present embodiment. The rolling elements 81 are arranged in first and second rows 83-1, 83-2. The first and second rows 83-1, 83-2 are arranged such that the central axis of the rolling elements 81 are inclined relative to each other in a V-shaped configuration. The rolling elements 81 in the present embodiment comprise tapered bearings, but other types of bearings may be employed. For example, the rolling elements 81 may comprise cylindrical bearings. The outer race 79 is a hardened roller race comprising an inner surface 85 for engaging the rolling elements 81; and an outer surface 87 for engaging the first rolling face. The inner surface 85 is profiled at least substantially to match the profile of the rolling elements 81 disposed in the first and second rows 83-1, 83-2. As shown in FIG. 7, the inner surface 85 is convex. This arrangement may promote alignment of the inner and outer races 77, 79. Alternatively, or in addition, sideways (lateral) loading on the first yoke 23-1 and/or the piston face may be reduced or eliminated. The first bearing 21-1 is suitable for high-speed use in the swash cam engine 1 and, at least in certain embodiments, may provide improved durability, for example when exposed to high impact loads. The second bearing 21-2 may have at least substantially the same configuration.

The first yoke 23-1 comprises first and second arms 30A, 30B arranged to support the spindle 75 of the first bearing 21-1. The first yoke 23-1 comprises one or more linear guide 87 for maintaining the axial alignment of the first yoke 23-1. The one or more linear guide 87 extend parallel to the longitudinal axis X-1 of the first yoke 23-1. The first yoke 23-1 shown in FIG. 8 comprises first and second linear guides 87-1, 87-2 disposed on opposing ends of the second arm 30A. The first and second linear guides 87-1, 87-2 project from the first arm 30A and locate in respective first and second channels (not shown) formed in the first carriage body 19. The first and second linear guides 87-1, 87-2 travel within the first and second channels as the first yoke 23-1 moves relative to the first carriage body 19. It will be understood that the first yoke 23-1 may comprise a single guide 87-*n* or more than one guide.

It will be appreciated that various changes and modifications can be made to the present invention without departing from the scope of the present application.

The carriage assembly 3-1 described herein comprises first and second bearings 21-1, 21-2 which are moveable relative to the carriage body 19. In particular, the first and second yokes 23-1, 23-2 are moveable along a longitudinal axis. In a variant, the carriage body 19 may comprise first and second body portions (not shown) which are moveable axially relative to each other. The first and second yokes 23-1, 23-2 may be mounted to the first and second body portions in a fixed arrangement which inhibits or suppresses relative movement. In this arrangement, the relative movement of the first and second body portions may be controlled to reduce dynamic loading of the first and second bearings 21-1, 21-2. A hydraulic chamber may be provided to control movement of the first and second body portions relative to each other.

The invention claimed is:

1. A carriage assembly for a swash plate engine having a swash plate, the carriage assembly comprising:

a carriage body for reciprocating along a longitudinal axis, the carriage body being configured to be connected to at least one piston; and at least one bearing assembly disposed on the carriage body;

wherein the or each bearing assembly comprises:

a rolling bearing configured to engage a rolling face of the swashplate; and a yoke for supporting the rolling bearing, the yoke being movable relative to the carriage body along the longitudinal axis.

2. A carriage assembly as claimed in claim 1, comprising a spring for biasing the yoke towards the swash plate.

3. A carriage assembly as claimed in claim 1, wherein the spring is configured operatively to engage a distal end of a connecting rod connected to the at least one piston.

4. A carriage assembly as claimed in claim 3, wherein the yoke comprises a plunger for moveably mounting the yoke.

5. A carriage assembly as claimed in claim 4, wherein the plunger is disposed in an aperture formed in the carriage body.

6. A carriage assembly as claimed in claim 5, comprising a hydraulic chamber for receiving a hydraulic fluid to displace the plunger relative to the carriage body.

7. A carriage assembly as claimed in claim 6, wherein the hydraulic chamber comprises:

a hydraulic chamber inlet for introducing the hydraulic fluid; and a hydraulic chamber outlet for expelling the hydraulic fluid.

8. A carriage assembly as claimed in claim 7, wherein an inlet valve is provided for selectively opening and closing the hydraulic chamber inlet.

9. A carriage assembly as claimed in claim 7, wherein the hydraulic chamber outlet is disposed in the yoke, the hydraulic chamber outlet being selectively placed in fluid communication with a carriage gallery provided in the carriage body.

10. A carriage assembly as claimed in claim 9, wherein the hydraulic chamber outlet is placed in fluid communication with the carriage gallery when the yoke is in a predetermined axial position.

11. A carriage assembly as claimed in claim 9, wherein the carriage gallery is configured to supply the hydraulic fluid to the rolling bearing.

12. A carriage assembly as claimed in claim 9, comprising a flow controller for controlling the supply of hydraulic fluid from the carriage gallery to the rolling bearing.

13. A carriage assembly as claimed in claim 12, wherein the flow controller is adjustable.

14. A carriage assembly as claimed in claim 12, wherein the flow controller comprises a bleed screw.

15. A carriage assembly as claimed in any one of claim 14, wherein the rolling bearing comprises a lubricant supply port for receiving the hydraulic fluid expelled from the hydraulic chamber.

16. A carriage assembly as claimed in claim 1, wherein the carriage assembly is configured to be connected to first and second pistons of the at least one piston; and wherein the at least one bearing assembly comprises first and second bearing assemblies for engaging opposing rolling faces of the swash plate.

17. A swash plate drive assembly comprising a carriage assembly as claimed in claim 1, and including the at least one piston and at least one connecting rod.

18. A swash plate drive assembly as claimed in claim 17, when dependent directly or indirectly on dependent claim 6, wherein the connecting rod comprises a connecting rod supply conduit for supplying hydraulic fluid to the hydraulic chamber.

19. A swash plate drive assembly as claimed in claim 18, wherein the connecting rod supply conduit is placed in fluid communication with a high-pressure source of hydraulic fluid when the connecting rod is in a predetermined position.

20. A swash plate drive assembly as claimed in claim 19, wherein the predetermined axial position comprises a top dead centre (TDC) position of the connecting rod.

* * * * *